(12) United States Patent
Hudec

(10) Patent No.: US 12,054,220 B2
(45) Date of Patent: Aug. 6, 2024

(54) BICYCLE REAR SUSPENSION

(71) Applicant: CMH PLUS HOLDINGS LTD., Nanaimo (CA)

(72) Inventor: Christopher Hudec, Nanaimo (CA)

( * ) Notice: Subject to any disclaimer, the term of this patent is extended or adjusted under 35 U.S.C. 154(b) by 505 days.

(21) Appl. No.: 17/425,627

(22) PCT Filed: Jan. 28, 2020

(86) PCT No.: PCT/CA2020/050098
§ 371 (c)(1),
(2) Date: Jul. 23, 2021

(87) PCT Pub. No.: WO2020/154800
PCT Pub. Date: Aug. 6, 2020

(65) Prior Publication Data
US 2022/0089246 A1    Mar. 24, 2022

Related U.S. Application Data

(60) Provisional application No. 62/798,211, filed on Jan. 29, 2019.

(51) Int. Cl.
*B62K 25/28* (2006.01)
*B62K 25/30* (2006.01)

(52) U.S. Cl.
CPC ............ *B62K 25/286* (2013.01); *B62K 25/30* (2013.01)

(58) Field of Classification Search
CPC ................................ B62K 25/286; B62K 25/30
See application file for complete search history.

(56) References Cited

U.S. PATENT DOCUMENTS

| | | | |
|---|---|---|---|
| 9,039,026 B2 * | 5/2015 | Hudec ................... | B62K 25/28 |
| | | | 280/283 |
| 9,156,521 B2 * | 10/2015 | Lumpkin ................ | B62K 3/02 |
| 9,216,791 B2 * | 12/2015 | Hudec ................... | B62K 25/28 |
| 2008/0277900 A1 | 11/2008 | I | |
| 2018/0194428 A1* | 7/2018 | Hudec ................... | B62K 25/30 |
| 2018/0265165 A1 | 9/2018 | Zawistowski | |
| 2018/0273136 A1 | 9/2018 | Voss | |

FOREIGN PATENT DOCUMENTS

| | | | | |
|---|---|---|---|---|
| DE | 102014019525 B4 * | 5/2022 | ............ | B62K 19/00 |
| WO | 2010033174 A1 | 3/2010 | | |
| WO | 2012122634 A1 | 9/2012 | | |
| WO | 2016134471 A1 | 9/2016 | | |

OTHER PUBLICATIONS

International Searching Authority, "Written Opinion of the International Search Authority", May 22, 2020, 6 pages, Canadian Intellectual Property Office.

* cited by examiner

*Primary Examiner* — Kevin Hurley

(57) ABSTRACT

Rear suspension system for a bicycle in which there are two links pivotally interconnecting the front triangle (being, the bicycle component having the seat and bottom bracket) and the rear triangle (being, the component to which the rear wheel is mounted), configured such that at a designer determined percentage of suspension compression, the link pivots on the front triangle are on, or in the vicinity of, a notional line passing through the bottom bracket axis of rotation and the rear wheel axis of rotation.

12 Claims, 10 Drawing Sheets

BICYCLE REAR SUSPENSION

This application claims the benefit of U.S. provisional patent application No. 62/798,211, filed 29 Jan. 2019.

FIELD OF THE INVENTION

The present invention relates to the field of bicycle rear suspensions.

BACKGROUND OF THE INVENTION

A bicycle frame is the main component of a bicycle, on to which wheels and other components are fitted. The great majority of today's rigid-frame bicycles have a frame with upright seating. Such upright rigid-frame bicycles generally feature the diamond frame, a truss consisting of two triangles: the front triangle and the rear triangle. In a conventional diamond frame, the "front triangle" is not a true triangle because it consists of four tubes: the head tube, top tube, down tube and seat tube. The head tube contains the headset, the set of bearings that allows the front fork (which supports the front wheel) to turn smoothly for steering and balance. The top tube connects the head tube to the seat tube at the top, and the down tube connects the head tube to the bottom bracket. The rear triangle consists of the seat tube and paired chain stays and paired seat stays. The chain stays run essentially parallel to the chain, connecting the bottom bracket to the rear fork ends (which support the rear wheel). The seat stays connect the top of the seat tube (at or near the same point as the top tube) to the rear fork ends.

Many modern bicycles do not utilize a diamond frame, for example because: the frame is constructed in such a way that it does not consist of tubes attached one to another (for example, frames made of composite materials); or the frame involves a rear suspension system permitting rearward components of the bicycle (e.g., the rear wheel) to move relative to other components of the bicycle (e.g., the seat); or both. However, the terms used to describe the members of a conventional diamond frame (being, head tube, top tube, down tube, seat tube, chain stays and seat stays) are often used to describe analogous features on non-diamond frames and are at times so used herein.

Most bicycles use a chain to transmit power to the rear wheel. The drivetrain begins with pedals which rotate the cranks, which are attached to a spindle that rotates within the bottom bracket. With a chaindrive, a chainring attached to a crank drives the chain, which in turn rotates the rear wheel via a rear sprocket. Most chaindrive systems have some form of gearing, typically comprising multiple rear sprockets of different sizes, multiple chainrings of different sizes and user controllable devices (referred to as derailleurs) for moving the chain between rear sprockets and between the chainrings, so as to selectively vary the gear ratio.

In chain drive systems, the portion of chain extending between the top of a chainring and the top of a rear sprocket conveys the motive force from the pedals to the rear wheels. When the rider is pedaling, this top portion of chain is under tension. In a bicycle without a rear suspension, this chain tension is resisted by the rear triangle, to which the rear wheel is mounted. However, in a bicycle with a rear suspension system, some portion of the force of such chain tension may be imparted to the suspension system. As well, movement of the rear suspension system relative to the bottom bracket may dynamically tension or slacken the portion of chain extending between the top of a chainring and the top of a rear sprocket, thereby affecting the pedaling resistance experienced by the rider. The direction of the force conveyed along the portion of chain extending between the top of a chainring and the top of a rear sprocket is referred to as the chain line. As bicycles typically have multiple chainrings and multiple rear sprockets so as to provide rider selectable gear ratios; most bicycles do not have a single chain line, but rather have multiple chain lines.

A bicycle suspension is the system or systems used to suspend the rider and all or part of the bicycle in order to protect them from the roughness of the terrain over which they travel. Bicycle suspension can be implemented in a variety of ways, including: front-fork suspension and rear suspension. It is uncommon for a mountain bike to have a rear suspension system but no front suspension system. Thus, rear suspension systems on mountain bikes are typically part of a full suspension system.

Bicycle rear suspension systems involve complicated dynamic interactions of multiple connected components and multiple performance considerations. For example, as bicycles are powered by human effort, effects on the drive train caused by suspension system movement that would, in the case of engine driven vehicles, be minor or unnoticeable, are significant in bicycles.

In the field of bicycle suspension systems, the following terms are generally used as follows:

Travel generally refers to how much movement a suspension allows, and is usually quantified based on the available range of movement of the wheel axle.

Jack refers to extension of the rear suspension, such as, for example, caused by pedaling forces or caused by braking (a feature of some early suspension designs).

Bob, pedal bob, or monkey motion refer to undesirable oscillation of the rear suspension caused by the inherent imbalance between the center of mass of each leg, as the legs move to rotate the cranks.

Squat refers to generally undesirable compression of the rear suspension, for example under acceleration (and the associated rearward weight shift) or as brake squat, being compression of the rear suspension caused by braking (which in moderation may be beneficial to counteract the normal forward weight transfer caused by braking).

Pedal feedback, also referred to as chainstay lengthening, can be felt by the rider as a torque on the crankset in the rotational direction opposite to forward pedaling and is caused by an increase in the distance between the bottom bracket and rear axle (due to suspension movement).

Anti-squat refers to chainstay lengthening related to pedaling-induced suspension extension (jack), which provides resistance to the weight shift of the rider due to acceleration and resulting compression of the rear suspension. Too much anti-squat or chainstay lengthening results in resistance to compression of the suspension due to pedal forces when the rear wheel hits an obstacle.

Sag refers to how much a suspension moves under just the static load of the rider. Sag allows the rear wheel to drop into depressions in the terrain, maintaining traction.

Sag point refers to a design/tuning parameter, being a desired suspension sag for a rider, which is generally in the range of 20-40% of the total suspension travel, but may be subject to the rider's preference and the suspension design.

Unsprung mass is the mass of the portions of bicycles that is not supported by the suspension systems.

The simplest bicycle rear suspension configuration is the single-pivot, in which the rear wheel of the bicycle is attached to the front triangle of the bicycle by a single swingarm (often a generally triangular component and often referred to as the rear triangle) pivoting about a pivot located on the front triangle. With the single-pivot design, the rear wheel absorbs bumps from irregular terrain by moving in a simple curve (i.e., a circular arc) about the pivot.

More sophisticated suspensions use a configuration of linkages that is more complicated than a mere single pivot and that generally provide for an axle path of travel during suspension compression and extension that is other than the simple curve about the pivot point achievable with the single-pivot suspensions. A popular linkage suspension design is shown in U.S. Pat. No. 5,899,480 (commonly referred to as a Horst Link suspension after the inventor, Horst Leitner). Dual short-link designs are a popular type of four-bar linkage suspension systems comprising two short links interposed between the front triangle and the rear triangle (i.e. the component to which the rear wheel is mounted). A dual short link design called the Virtual Pivot Point suspension (or VPP), is disclosed in U.S. Pat. No. 6,206,397. A dual short link design that employs links pivoting in the same direction is disclosed in U.S. Pat. No. 7,128,329 (Weagle).

The factors that are typically manipulated to achieve the best balance of pedaling efficiency and bump absorption are: Anti-Squat; Chainstay lengthening/Pedal-kickback; Leverage rate of/on the rear shock; and Axle Path. Of these, the primary metric used to determine the pedaling efficiency of a rear suspension design is Anti-Squat.

Anti-squat was introduced into popular mountain bike suspension design by Mr. Dave Weagle, with his first DW-Link patent (U.S. Pat. No. 7,048,292 B2). Mr. Weagle applied the suspension design considerations for motorcycles and other motorized vehicles to mountain bike suspension. Anti-Squat refers to a suspension design's (and gear combination's) resistance to suspension squat under acceleration.

Many known suspensions endeavour to optimize pedaling efficiency by providing sufficient anti-squat to balance the rearward weight shift due to acceleration, in selected optimal gear combinations, which balancing is referred to as 100% anti-squat.

Many dual short link suspensions featuring two short links rotating in the same direction emulate the function of Weagle's or the VPP suspensions in various ways, but differ with respect to the placement, length and pivot locations of the two short links. The chainstay lengthening/anti-squat effects are derived from the placement of the links and pivot points. Many known designs focus on the designer's version of optimal anti-squat characteristics, minimizing overall chainstay lengthening to varying degrees, the use of low speed compression damping on the shock absorber to reduce unwanted suspension movement, and minimizing the effects of the rear brake on the suspension system.

However, when comparing bicycles with similar values of the above four metrics, particularly anti-squat, they perform differently. For example, they may have more or less pedal bob. Typically, bicycles with high anti-squat values that also have pedal bob have significant "suspension jack", which is an indication that there is too much anti-squat, which wastes a rider's energy because some of the pedaling force is wasted in lifting the rider.

Numerous bicycle systems and variations of same are known. For example, as described in the following patent documents: U.S. Pat. No. 5,553,881, BICYCLE REAR SUSPENSION SYSTEM, Klassen et al., 10 Sep. 1996; U.S. Pat. No. 5,628,524, BICYCLE WHEEL TRAVEL PATH FOR SELECTIVELY APPLYING CHAINSTAY LENGTHENING EFFECT AND APPARATUS FOR PROVIDING SAME, Klassen et al., 13 May 1997; U.S. Pat. No. 6,206, 397, BICYCLE WHEEL TRAVEL PATH FOR SELECTIVELY APPLYING CHAINSTAY LENGTHENING EFFECT AND APPARATUS FOR PROVIDING SAME, Klassen et al., 27 Mar. 2001; U.S. Pat. No. 6,843,494, REAR SUSPENSION SYSTEM FOR TWO-WHEELED VEHICLES, PARTICULARLY BICYCLES, Lam, 18 Jan. 2005; U.S. Pat. No. 6,969,081, BICYCLE REAR SUSPENSION, Whyte, 29 Nov. 2005; U.S. Pat. No. 7,128,329, VEHICLE SUSPENSION SYSTEMS, Weagle, 31 Oct. 2006; U.S. Pat. No. 7,240,912, BICYCLE REAR SUSPENSION, Whyte, 10 Jul. 2007; U.S. Pat. No. 7,828,314, VEHICLE SUSPENSION SYSTEMS, Weagle, 9 Nov. 2010; U.S. Pat. No. 7,934,739, BICYCLE REAR SUSPENSION, Domahidy, 3 May 2011; US 2008/0,054,595 BICYCLE FRAME WITH A COUNTER-ROTATING FOUR BAR LINKAGE SYSTEM, Lu, 6 Mar. 2008; US 2008/0,277,900, BICYCLE WITH A COMMON PIVOT SHOCK ABSORBER, I, 13 Nov. 2008; U.S. Pat. No. 7,048,292, BICYCLE SUSPENSION SYSTEMS, Weagle, 23 May 2006; US 2014/0,042,726, SUSPENSION SYSTEM FOR WHEELED VEHICLES, Canfield et al., 13 Feb. 2014; U.S. Pat. No. 9,039,026, BICYCLE SUSPENSION SYSTEM, Hudec, 26 May 2015; and WO 2016/134471, REAR SUSPENSION SYSTEM FOR A BICYCLE, Hudec, 1 Sep. 2016.

SUMMARY OF THE INVENTION

Excluding single-pivot rear suspension systems, most bicycle rear suspension systems feature an instant centre. An instant centre, also called the instantaneous centre or instant centre of rotation, is the point around which all points in a body undergoing planar movement that is neither a pure displacement (i.e., not merely linear) nor a pure rotation (i.e., not merely rotation about a fixed centre), are rotating at a specific instant in time. As the planar movement is not a pure rotation, there is a different instant centre for each instant in time/position of the body. The different instant centres define a curve, referred to as the moving centrode and at times referred to herein as the path, or path of movement, of the instant centre. In the case of a body subject to constrained reciprocating movement, the instant centre follows a constrained reciprocating path.

In a bicycle rear suspension system in which the "rear triangle" (being the component to which the axle of the rear wheel is mounted) is connected to the front triangle by two links, the rear triangle has an instant centre. The instant centre of the "rear triangle" and the path of movement of the instant centre can readily be visualized from the two links connecting the rear triangle to the front triangle. The instant centre is located at the intersection of an imaginary straight line passing through the first link rear triangle pivot axis (being the axis of the pivotal couple of the first link to the rear triangle) and the first link front triangle pivot axis (being the axis of the pivotal attachment of the first link to the front triangle); and an imaginary straight line passing through the second link rear triangle pivot axis (being the axis of the pivotal couple of the second link to the rear triangle) and the second link front triangle pivot axis (being the axis of the pivotal attachment of the second link to the front triangle).

The differences in how different suspension designs performed have historically been explained by differences in suspension type, such as a Horst Link design versus a dual short link design, axle path, anti-squat, chainstay lengthening and the leverage rate applied to the rear shock by the suspension linkage. However, the inventor understands that suspension type is only one factor and that other factors are at least as important to suspension performance.

The inventor understands that the significant factors determining the efficiency of a rear suspension design are, when the suspension is at the designer determined compression (which may, but need not, be the design sag point): Instant Centre location; Anti-Squat value; Rear Axle location; Bottom Bracket location, and Pivot Locations on the front triangle where the rear suspension attaches to the front triangle. In the case of a 6-bar rear suspension design, the location of the chainstay-seatstay pivot axis, third link front triangle pivot axis, and third link seatstay pivot axis are also material.

These locations determine how much leverage the rear triangle has on the front triangle, and vice versa. This leverage value is different than the leverage generated by Anti-Squat, which is essentially the leverage between the instant center location and the bottom bracket. The fact that the rear triangle has a leverage rate on the front triangle, and the front triangle has a corresponding leverage rate on the rear triangle, is the reason different suspension designs with similar Anti-Squat, Chainstay lengthening, Leverage Rate (on the rear shock), and Instant Center location at sag, but different suspension layouts, perform differently.

To understand the leverage value between the front and rear triangles, consider how force is transferred from the front triangle to the rear triangle, and vice versa. This is most easily done from a statics perspective, with force vectors. There are three force vectors that are involved with force transfer between the front and rear triangles. These are the acceleration force vector, and the two chain tension force vectors.

The acceleration force vector is parallel to the line formed by the tires' contact points on the ground. This force vector acts on the rear triangle at the rear wheel's axle, and is transferred to the front triangle where the rear triangle attaches to the front triangle via the suspension linkages. That is, in four (or more) bar suspensions, the acceleration force vector is split between the two (or more) pivotal attachments on the front triangle. The acceleration force vector puts the two pivotal attachments on the front triangle in compression. The acceleration force vector is a dynamic force related to the anti-squat value and rear wheel traction. The chain tension force vector is more of a static force and is affected by the location of the pivots on the front and rear triangles.

The chain tension force vectors are the two force vectors generated by chain tension. They run parallel to the upper chain line; one vector passes through the rear axle, and the other vector passes through the bottom bracket. There are two chain tension force vectors because of Newton's Third Law; "For every action, there is an equal and opposite reaction". With a bicycle rear suspension, chain tension pulls the rear triangle toward the front triangle, and it also pulls the front triangle toward the rear triangle.

The splitting/distribution of the chain tension force vector between the two pivots on the front triangle can be reasonably approximated by a simple beam equation. The two force vectors created at the pivot locations on the front triangle resolve back into one opposing force vector at the location of the Instant Centre (IC). The two force vectors at the two pivots are similar to the ends of a teeter totter, and the IC is similar to the pivot of a teeter totter.

Conceptually, it is useful to consider the location of the IC relative to the pivots on the front triangle as defining three possible regimes, referred to herein as: Balance of Torque, Mono Torque, and Pincer. Though to be clear, there is not a sharp demarcation between the regimes. They are on a continuum; as the suspension layout approaches a regime, it takes on more of the characteristics of that regime. The regimes differ with respect to how much leverage the rear triangle has on the front triangle (or vice versa), with Balance of Torque regime bikes having the easiest to generate (most) leverage between the two triangles, and Pincer regime bikes having the most difficult to generate (least) leverage between the two triangles.

Balance of Torque occurs when the IC is located at a vertical location (with respect to the plane/line defined by the ground surface/wheel contact points) between the vertical locations of the pivots on the front triangle. With "pure" Balance of Torque regimes, the chain tension force vector is split between the pivot locations on the front triangle, and both pivots are under compression, with respect to chain tension. A balance of torque bike will have relatively high leverage on the suspension linkage with respect to chain tension. To be clear, the inventor understands that it is possible for the IC to be below the lower pivot and to have both pivots on the front triangle under compression, but it is an unusual configuration; the IC must be below and rearward of the lower pivot on the front triangle for this to occur.

The Mono Torque regime occurs when the IC is at a vertical location (with respect to the plane/line defined by the ground surface/wheel contact points) on or below the vertical location of the lower pivot location on the front triangle. The chain tension force vector puts the lower pivot location under compression, and the upper pivot location under tension, with respect to chain tension. A mono torque bike has less leverage between the front and rear triangles than a balance of torque bike, with respect to chain tension, even with the same amount of anti-squat.

The Pincer regime occurs when the IC is at a vertical location (with respect to the plane/line defined by the ground surface/wheel contact points) on or above the vertical location of the upper pivot location on the front triangle. The chain tension force vector puts both pivot locations on the front triangle under compression, with respect to chain tension. A Pincer bike has less leverage between the front and rear triangles than a mono torque bike, with respect to chain tension, even with the same amount of anti-squat.

The amount of leverage between the two triangles affects how easily the leverage created by Anti-Squat is generated. If it is easy to generate the anti-squat force, it is easy to resist acceleration squat. but it is also easy for bump forces to cause pedal kickback due to chainstay lengthening.

Conversely, if it is more difficult to generate the anti-squat force, it is harder to resist acceleration squat, but also harder for bump forces to cause pedal kickback due to chainstay lengthening. Importantly, this has the advantage of requiring "more" anti-squat to achieve "the same" squat resistance compared to suspension designs where it's easier to generate the anti-squat force. This is an advantage because, if you need "more" anti-squat to generate "the same" squat resistance, you will typically have a more rearward axle path. A rearward axle path is useful when absorbing impacts from bumps on the ground, because the more rearward the axle path is, the easier it is for the rear wheel to move up and over a bump.

The rear suspensions disclosed herein include embodiments aimed at minimizing the torque applied to the front triangle by the chain tension force vectors, on the understanding that minimizing the torque applied to the front triangle also reduces the leverage each triangle has over the other, which allows for higher anti-squat values, which in turn permits a more rearward axle path.

Because bicycles employ a gearing system that results in multiple chain lines, it is not possible to optimize the rear suspension for every gear combination, unless the front chain ring and rear sprocket are "fixed" and some sort of gearbox drivetrain is employed. It is possible and beneficial in some scenarios to optimize a rear suspension design for a specific gear combination. This could be the gear combination that produces the greatest leverage between the front and rear triangles (largest sprocket on the cassette), the gear combination that generates the most anti-squat, or any chain line, depending on what the designer believes is most beneficial.

The inventor understands that although there are two chain force vectors, as both chain force vectors transfer force through the rear axle and bottom bracket, in every gear combination the majority of the chain tension force vector is encompassed by, and for design purposes suitably characterized by, a notional line passing through the rear axle axis of rotation and the bottom bracket axis of rotation.

The inventor understands that locating the suspension link pivots on the front triangle on a line parallel to a notional line passing through the rear axle axis of rotation and the bottom bracket axis of rotation when the bicycle is at the sag point, chain tension applies the least amount of torque on the front triangle, on average, and evenly distributes force due to chain tension between the two pivots on the front triangle, in different gear combinations. The inventor also understands that locating the suspension link pivots on the front triangle on a line parallel to the upper chain line when the bicycle is at the sag point, chain tension applies the least amount of torque on the front triangle in the specific gear combination used to obtain the upper chain line. The inventor also understands that locating the suspension link pivots on the front triangle on a line parallel to the upper chain line, and when that line intersects the center of the bottom bracket at the sag point, chain tension applies the least amount of torque on the front triangle, and evenly distributes force due to chain tension between the two pivots when the chain is in that specific gear combination.

Further, the inventor understands that locating the suspension link pivots on the front triangle on a notional line passing through the rear axle axis of rotation and the bottom bracket axis of rotation at a designer selected suspension compression (which may be, but need not be, the sag point), chain tension applies the least amount of torque on the front triangle, and evenly distributes force due to chain tension between the two pivots. The inventor also understands that acceptable suspension performance may be achieved with the suspension link pivots on the front triangle being located in the vicinity of but not precisely on the notional line passing through the rear axle axis of rotation and the bottom bracket axis of rotation at the designer selected suspension compression. Preferably, the pivot axis of each of the link pivots on the front triangle is within about 30 mm of the notional line passing through the rear axle axis of rotation and the bottom bracket axis of rotation at the designer selected suspension compression. More preferably, the pivot axis of each of the link pivots on the front triangle is within about 18 mm of the notional line passing through the rear axle axis of rotation and the bottom bracket axis of rotation at the designer selected suspension compression.

At times herein, the designer selected suspension compression at which the suspension link pivots on the front triangle are on (or in the vicinity of) the notional line passing through the rear axle axis of rotation and the bottom bracket axis of rotation, is referred to as the suspension compression percentage (%) for which the suspension configuration is optimized.

The inventor understands that acceptable general suspensions performance may be achieved with the suspension configuration optimized for compression percentages in the range of 10% to 100%. To be clear, as the chain tension force vector has the least leverage between the front and rear triangles at the optimized compression, which makes it harder for chain tension to generate the anti-squat force, it is understood that a suspension configuration optimized for 100% compression makes it easier to achieve full suspension travel. The inventor understands that for many applications, the designer selected compression for which a suspension system may be optimized may be in the range of 30% to 60% compression.

SUMMARY OF THE DRAWINGS

The drawings are schematic right-side elevation views of bicycle rear suspension system embodiments, shown relative to a supporting horizontal surface.

FIG. 1 shows a dual short link embodiment optimized for 100% compression, in the unloaded at-rest position (that is, 0% compression).

DETAILED DESCRIPTION WITH REFERENCE TO THE DRAWINGS

Figure 1:
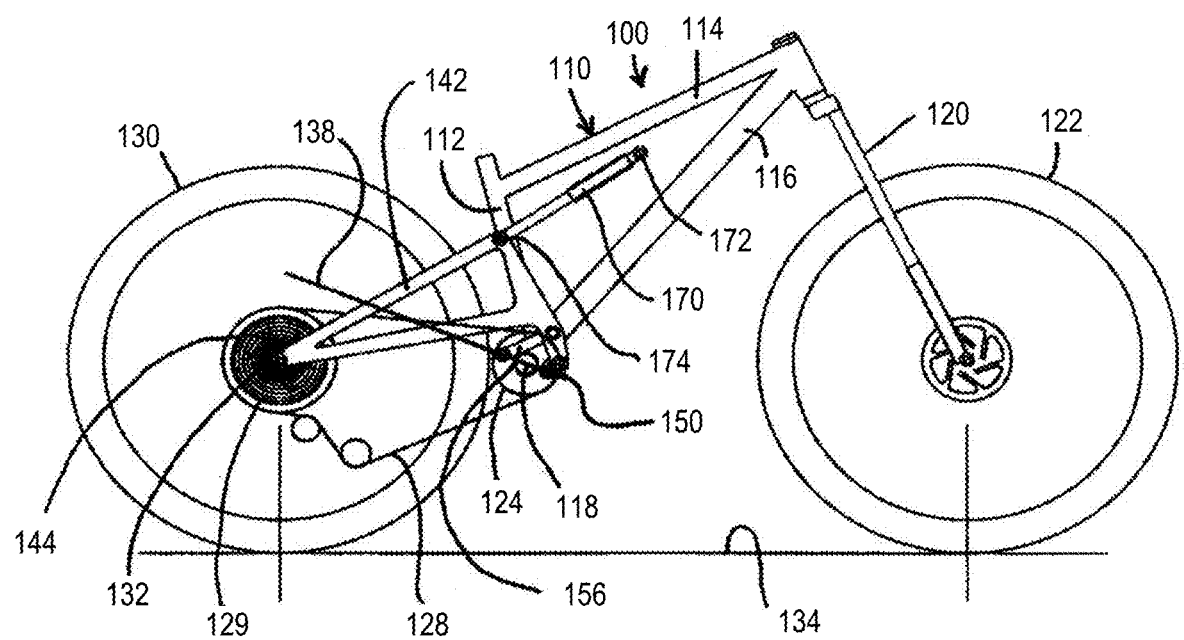
FIG. 1, shows a representation of a complete bicycle, but for clarity and enlargement, the other Fig's show representations of the rearward components of the bicycle.

In the drawings, the schematic representations of the bicycle embodiments of the present invention show conventional bicycle features in a simplified manner that for current purposes ignores the possible variations in configurations and details of these features. For example, it is well known that modern materials permit configurations considerably different from the simple "triangle" composed of tubes, suggested by the schematic representations.

In FIG. 1, there is shown a bicycle 100 including a front triangle 110. The front triangle 110 is schematically represented as having a seat tube 112, a top tube 114 and a down tube 116. A bottom bracket 118 is located at the juncture of the seat tube 112 and the down tube 116. A chainring 124 is mounted at the bottom bracket 118. As is well, known, crank arms are rotatably mounted at the bottom bracket 118, but crank arms are not indicated in the drawings for clarity. Mounted to the front triangle 110 there are front forks 120, to which the front wheel 122 is mounted. The bicycle 100 includes a rear wheel 130, attached to the front triangle 110 via a rear suspension system embodiment of the present invention. The bicycle 100 includes a chain 128 and a rear sprocket 129.

The rear suspension system embodiments all include a rear triangle 142, being the component to which the rear wheel 130 is mounted at the rear wheel mount 144 so as to define the rear wheel axis of rotation 132. To be clear, in some of the embodiments described herein and shown in the drawings, the component to which the rear wheel 130 is mounted is not in the shape of a triangle. However, the term rear triangle 142 is used throughout for conceptual consistency.

The drawings include a support line 134 indicating a notional horizontal surface that with the suspension at 0% compression supports both the front wheel 122 and rear wheel 130. The drawings also include a displacement line 136, abutting the bottom of the rear wheel 130 and parallel to the support line 134 to illustrate the displacement of the rear wheel 130 relative to the support line 134 with the suspension at greater than 0% compression. To be clear, it is understood that in use in real world conditions (which would in most instances include front shocks), the front triangle 110 would undergo some translation responsive to ride conditions causing rear suspension compression, but for the purpose of illustration, in the drawings, the orientation of the front triangle 110 relative to the support line 134 is unaffected by rear suspension compression. For illustration purposes, the drawings also include an alignment indicator 138, being a notional line indicating the alignment of components/axis.

Some of the embodiments include two links interconnecting the front triangle 110 and the rear triangle 142, being: a first link 150 having a first link front triangle pivot axis 152 and a first link rear triangle pivot axis 154; and a second link 156 having a second link front triangle pivot axis 158 and a second link rear triangle pivot axis 160.

The embodiments include a shock absorber 170 having a shock front-triangle mount end 172 and a shock suspension mount end 174. The shock front-triangle mount end 172 is mounted to the front triangle 110, although, reflective of the schematic nature of the drawings, in some of the drawings, a connection between the shock front-triangle mount end 172 and the front triangle 110 is not indicated.

The following approach is used herein for providing numerical information for the position of components and pivots/couples with respect to bicycle not loaded (i.e., with the suspension system at its uncompressed "at-rest" position) and with a flat surface (i.e., the support line 134) supporting both wheels of the bicycle: an X,Y coordinate system with the X axis parallel to the flat surface, with the intersection of the X axis and Y axis aligned with the axis of rotation within the bottom bracket, and with the units in millimetres (mm).

In what follows, negative X values for pivot locations may be bounded by the radius of the rear wheel 130. However, it is understood that it is possible to have pivot and couple locations that intrude into the radius of the rear wheel.

Figure 2:
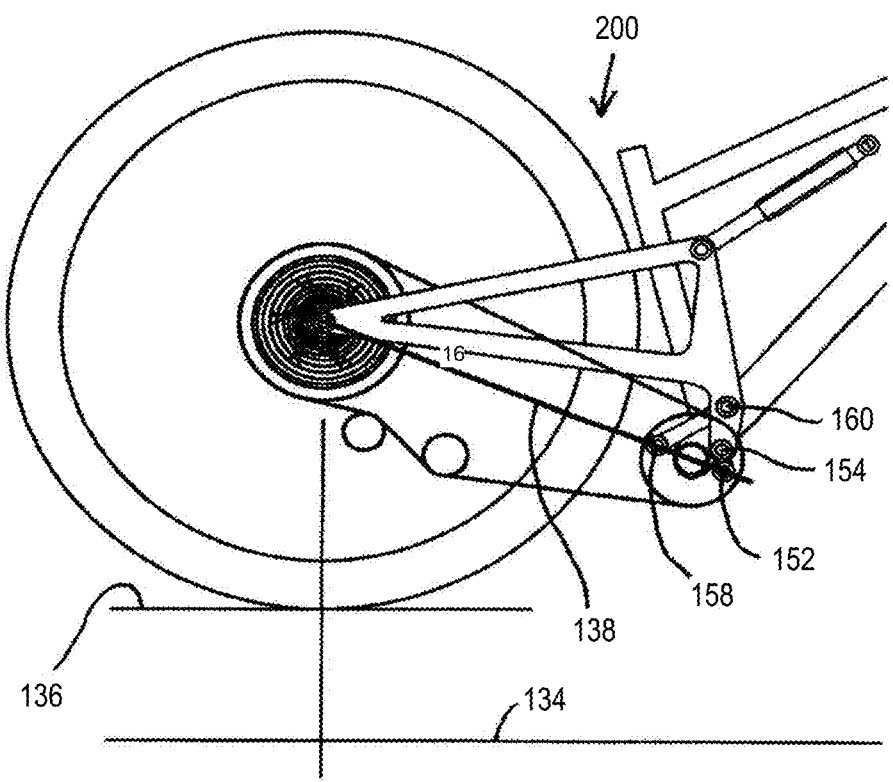
FIG. 2 shows the dual short link embodiment optimized for 100% compression of FIG. 1, at 100% compression.

In the dual short link embodiment optimized for 100% compression 200 shown in FIGS. 1 and 2, the X,Y coordinates are:
rear wheel axis of rotation 132: −441.0, 6.9;
first link front triangle pivot axis 152: 38.6, −16.0;
first link rear triangle pivot axis 154: 60.3, 2.5;
second link front triangle pivot axis 158: −41.5, 17.3; and
second link rear triangle pivot axis 160: 47.7, 58.5.

Figure 3:
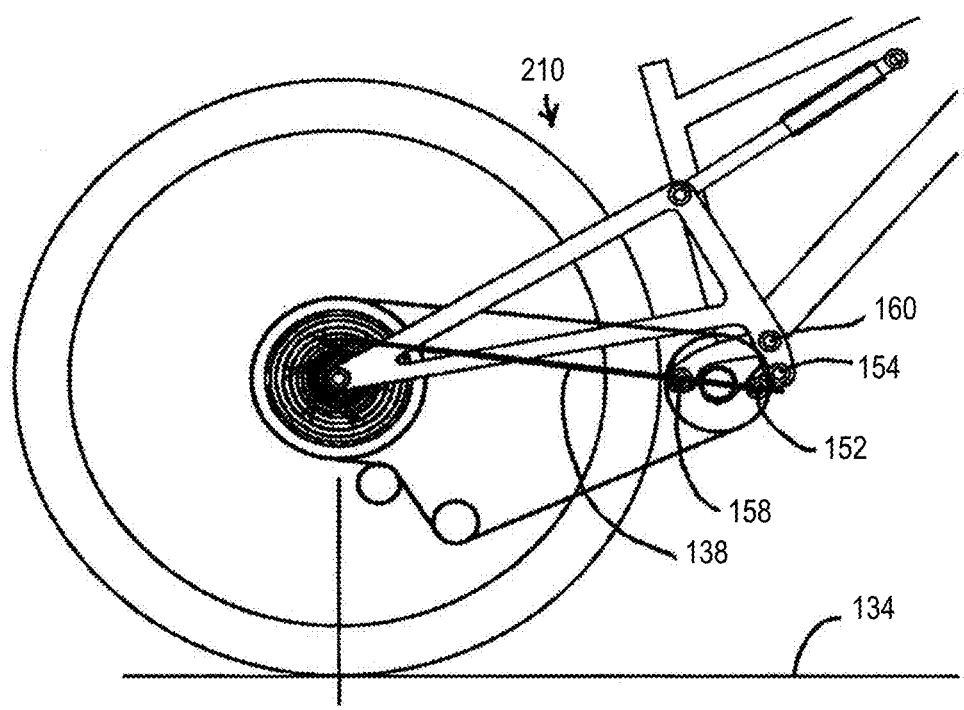
FIG. 3 shows a dual short link embodiment optimized for 30% compression, at 0% compression.
Figure 4:
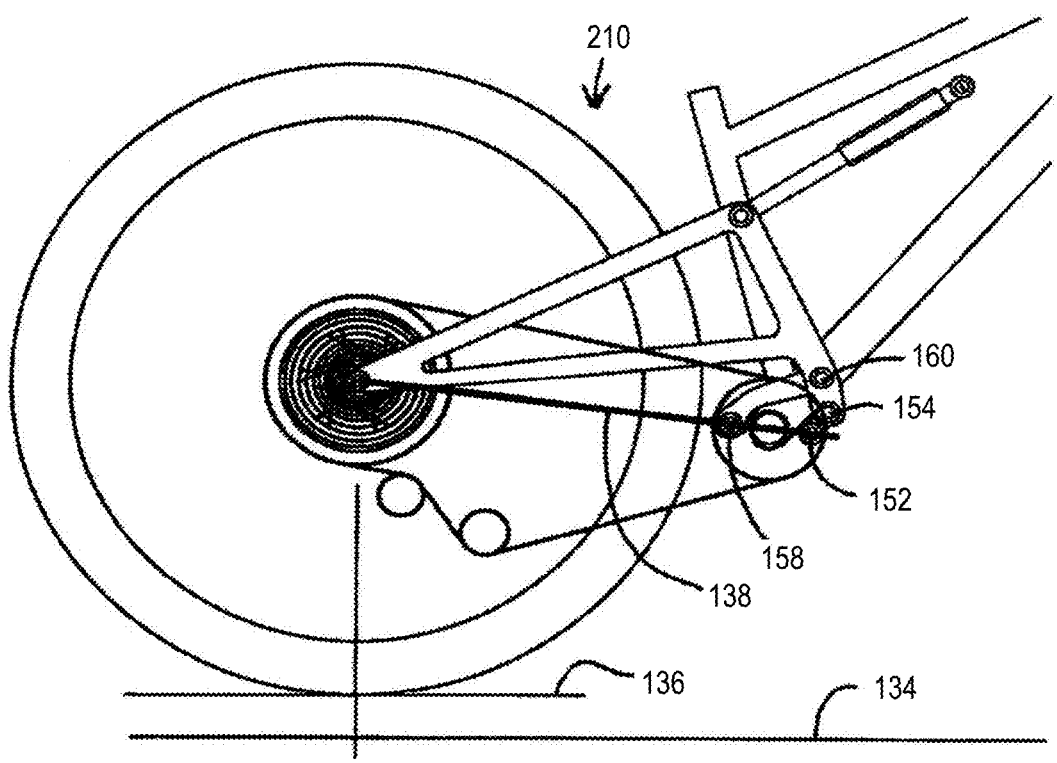
FIG. 4 shows the dual short link embodiment optimized for 30% compression of FIG. 3, at 30% compression.

In the dual short link embodiment optimized for 30% compression 210 shown in FIGS. 3 and 4, the X,Y coordinates are:
rear wheel axis of rotation 132: −441.0, 6.9;
first link front triangle pivot axis 152: 46.0, −5.9;
first link rear triangle pivot axis 154: 71.4, 12.6;
second link front triangle pivot axis 158: −42.3, 6.1; and
second link rear triangle pivot axis 160: 60.7, 53.1.

Figure 5:
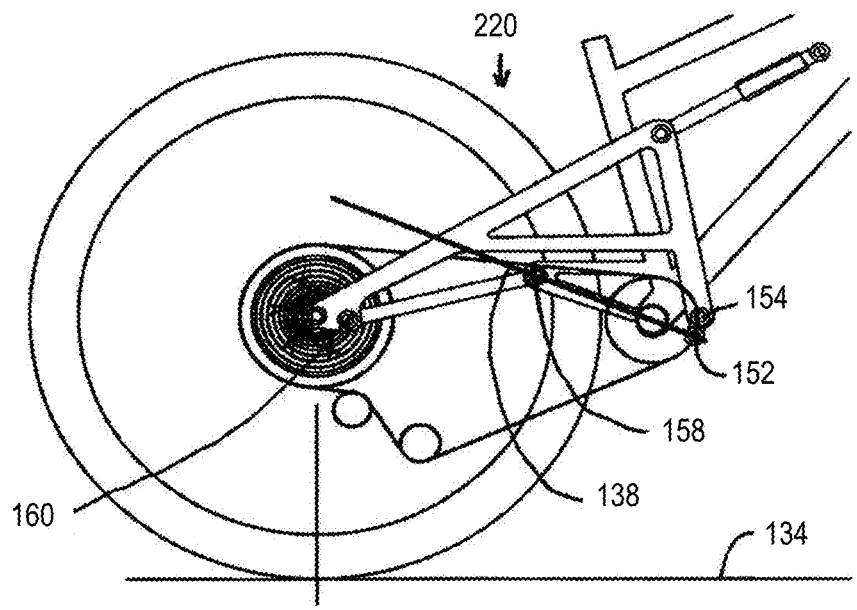
FIG. 5 shows a long link embodiment optimized for 100% compression, at 0% compression.
Figure 6:
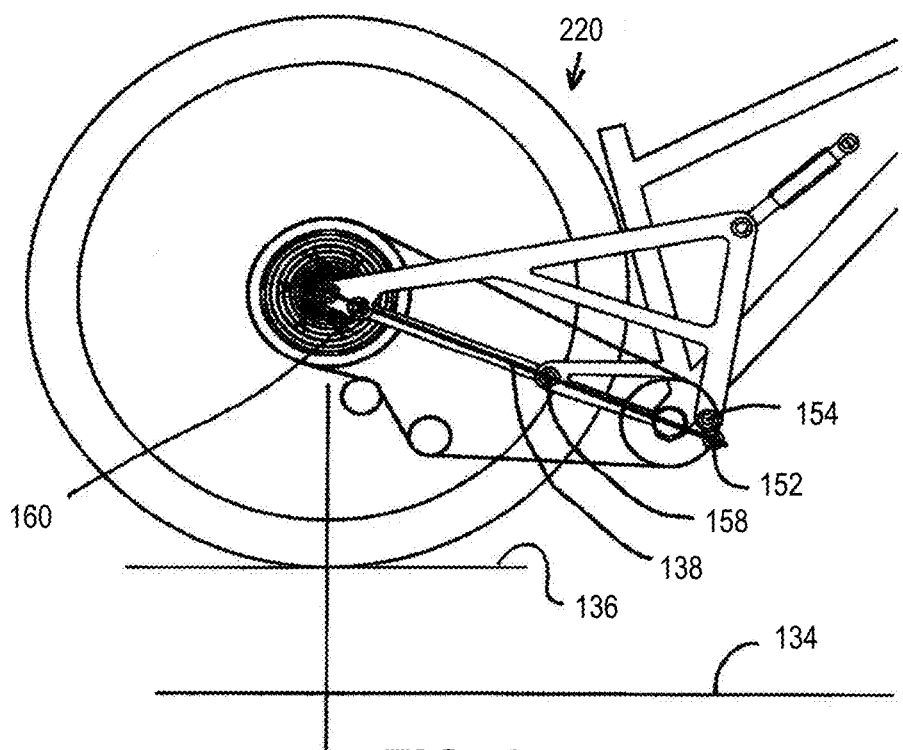
FIG. 6 shows the long link embodiment optimized for 100% compression of FIG. 5, at 100% compression.

In the long link embodiment optimized for 100% compression 220 shown in FIGS. 5 and 6, the X,Y coordinates are:
rear wheel axis of rotation 132: −441.0, 6.9;
first link front triangle pivot axis 152: 55.3, −23.4;
first link rear triangle pivot axis 154: 63.5, 3.9;
second link front triangle pivot axis 158: −150.0, 62.5; and
second link rear triangle pivot axis 160: −399.6, 1.5.

As illustrated in FIG. 6, in the long link embodiment optimized for 100% compression 220, at 100% compression, the second link rear triangle pivot axis 160 is on the alignment indicator 138, which results in very low anti-squat at the optimized compression.

Figure 7:
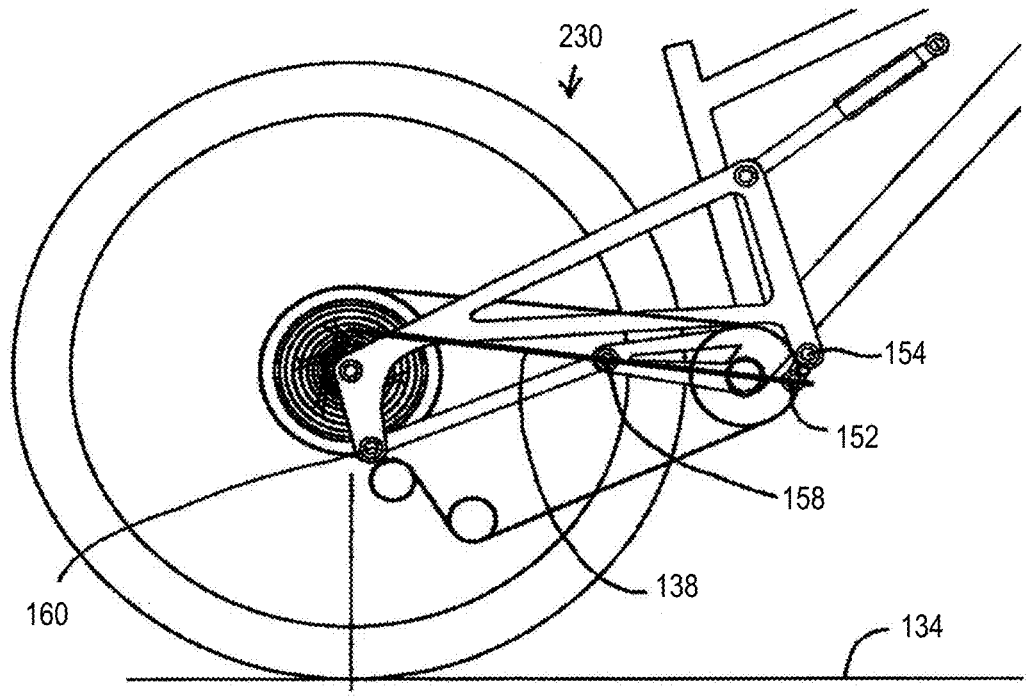
FIG. 7 shows a long link embodiment optimized for 30% compression, at 0% compression.
Figure 8:
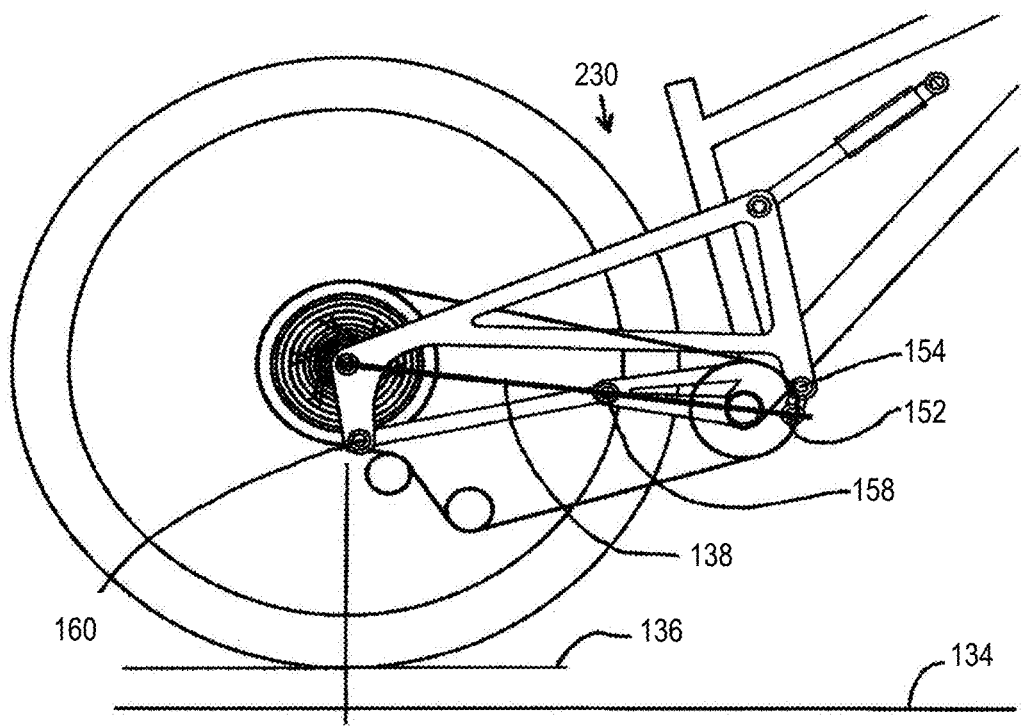
FIG. 8 shows the long link embodiment optimized for 30% compression of FIG. 7, at 30% compression.

In the long link embodiment optimized for 30% compression 230 shown in FIGS. 7 and 8, the X,Y coordinates are:
rear wheel axis of rotation 132: −441.0, 6.9;
first link front triangle pivot axis 152: 54.6, −6.5;
first link rear triangle pivot axis 154: 70.5, 25.2;
second link front triangle pivot axis 158: −153.5, 20.1; and
second link rear triangle pivot axis 160: −418.5, −86.3.

Figure 9:
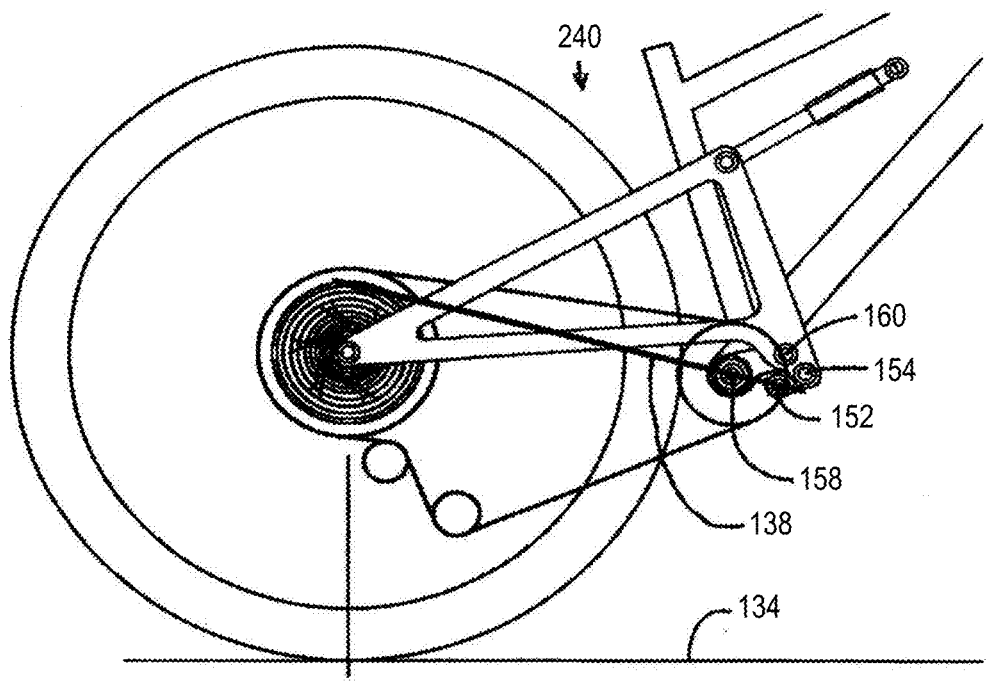
FIG. 9 shows a dual short link with second link front triangle pivot axis concentric with bottom bracket embodiment optimized for 49% compression, at 0% compression.
Figure 10:
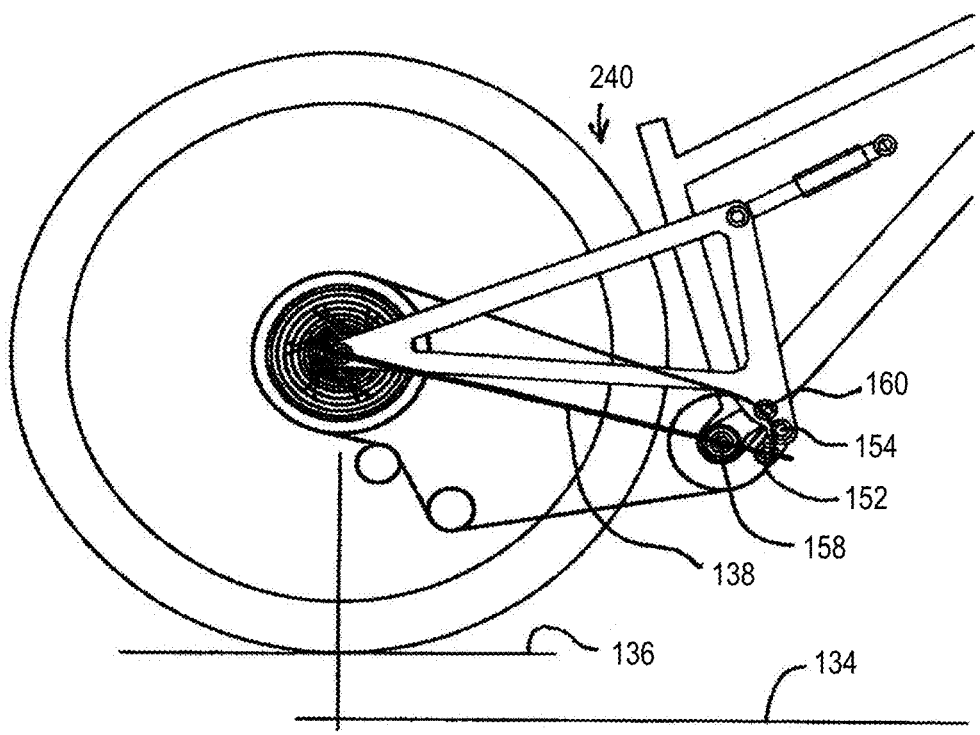
FIG. 10 shows the dual short link with second link front triangle pivot axis concentric with bottom bracket embodiment optimized for 49% compression of FIG. 9, at 49% compression.

In the dual short link with second link front triangle pivot axis concentric with bottom bracket embodiment optimized for 49% compression 240 shown in FIGS. 9 and 10, the X,Y coordinates are:
rear wheel axis of rotation 132: −431.0, 26.0;
first link front triangle pivot axis 152: 51.4, −13.0;
first link rear triangle pivot axis 154: 81.3, 0.5;
second link front triangle pivot axis 158: 0.0, 0.0; and
second link rear triangle pivot axis 160: 60.2, 23.3.

Figure 11:
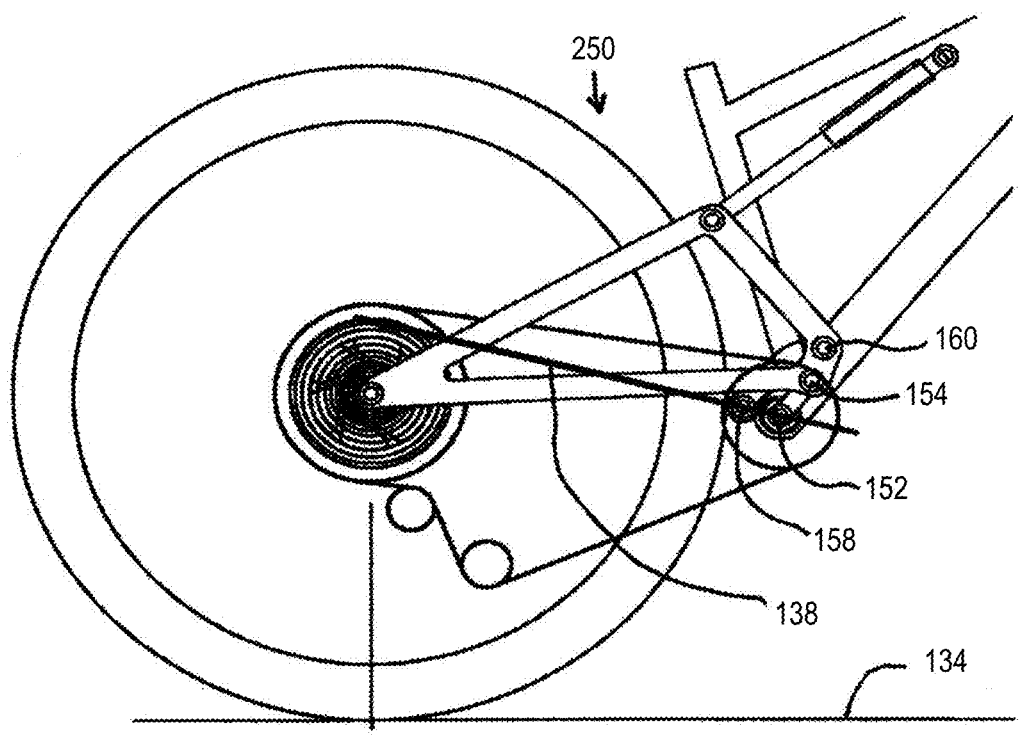
FIG. 11 shows a dual short link with first link front triangle pivot axis concentric with bottom bracket embodiment optimized for 49% compression, at 0% compression.
Figure 12:
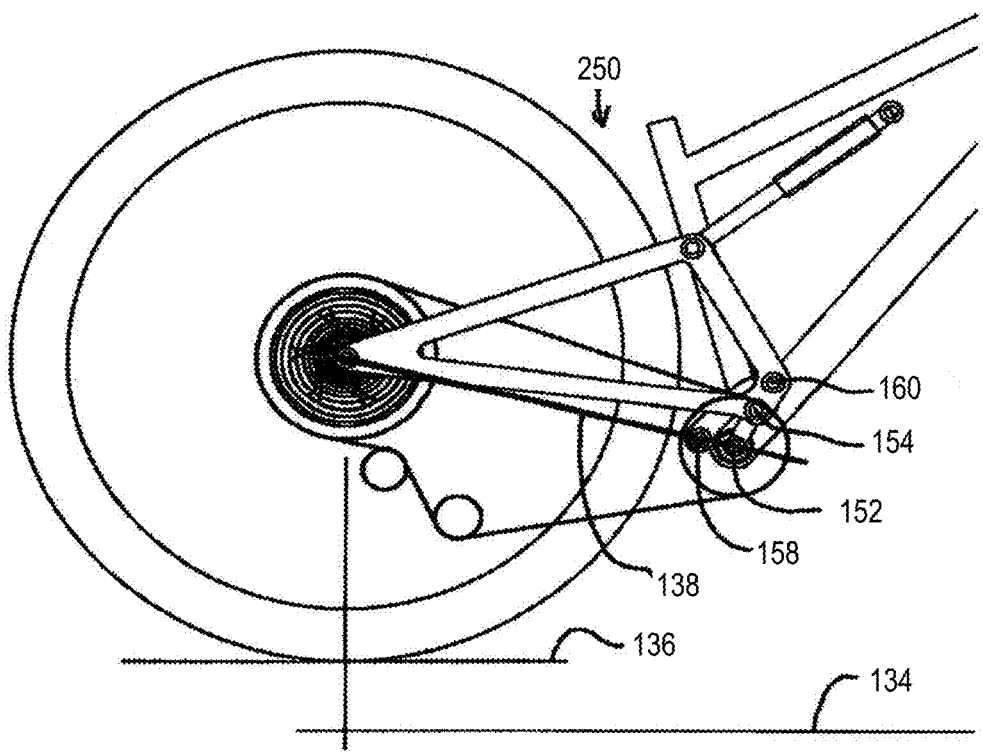
FIG. 12 shows the dual short link with first link front triangle pivot axis concentric with bottom bracket embodiment optimized for 49% compression of FIG. 11, at 49% compression.

In the dual short link with first link front triangle pivot axis concentric with bottom bracket embodiment optimized for 49% compression 250 shown in FIGS. 11 and 12, the X,Y coordinates are:
rear wheel axis of rotation 132: −431.0, 26.0;
first link front triangle pivot axis 152: 0.0, 0.0;
first link rear triangle pivot axis 154: 33.0, 39.0;
second link front triangle pivot axis 158: −38.9, 9.8; and
second link rear triangle pivot axis 160: 46.1, 76.2.

Figure 13:
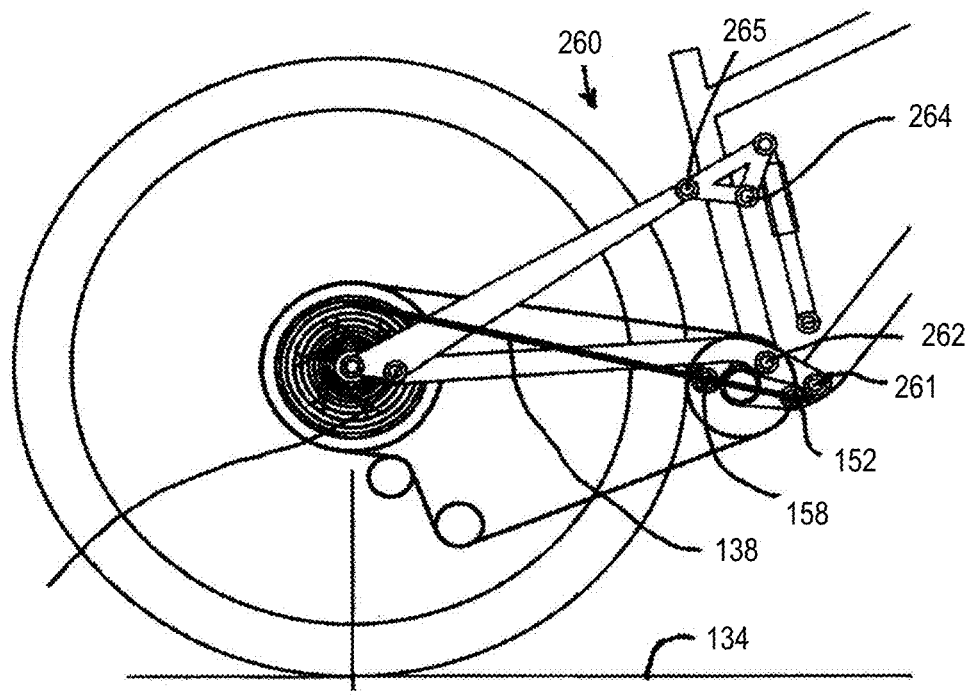
FIG. 13 shows a 6-bar suspension embodiment optimized for 46% compression, at 0% compression.
Figure 14:
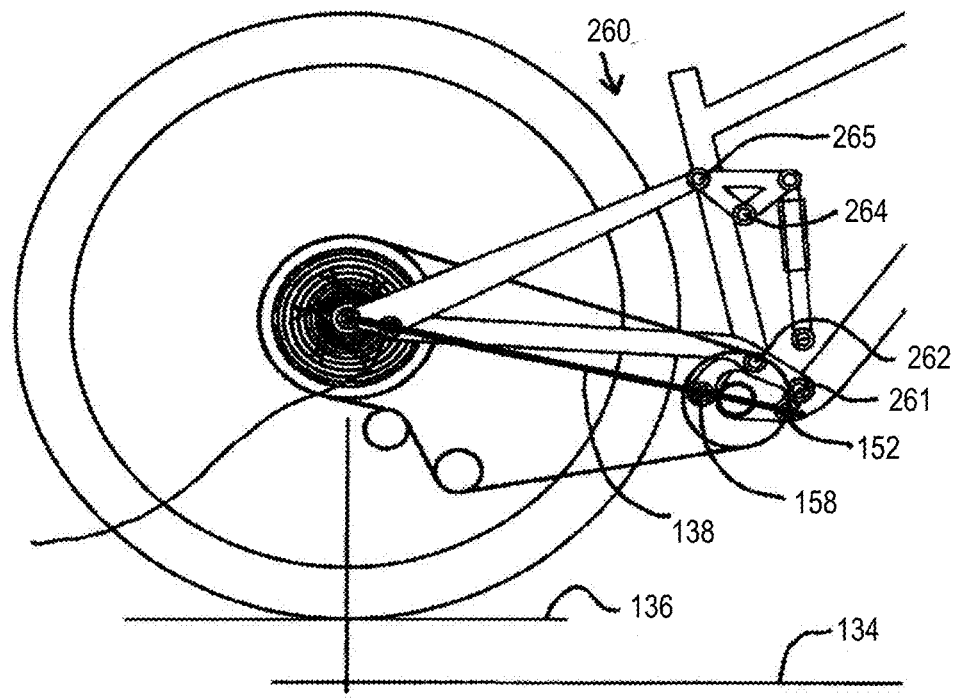
FIG. 14 shows the 6-bar suspension embodiment optimized for 46% compression of FIG. 13, at 46% compression.

In the 6-bar suspension embodiment optimized for 46% compression 260 shown in FIGS. 13 and 14, the X,Y coordinates are:
rear wheel axis of rotation 132: −433.8, 24.1;
first link front triangle pivot axis 152: 56.0, −13.0;
first link chainstay pivot axis 261: 82.0, 1.1;
second link front triangle pivot axis 158: −39.4, 9.0;
second link chainstay pivot axis 262: 28.6, 28.2;
chainstay-seatstay pivot axis 263: −385.4, 18.5;
third link front triangle pivot axis 264: 8.0, 228.4; and
third link seatstay pivot axis 265: −59.1, 236.5.

Figure 15:
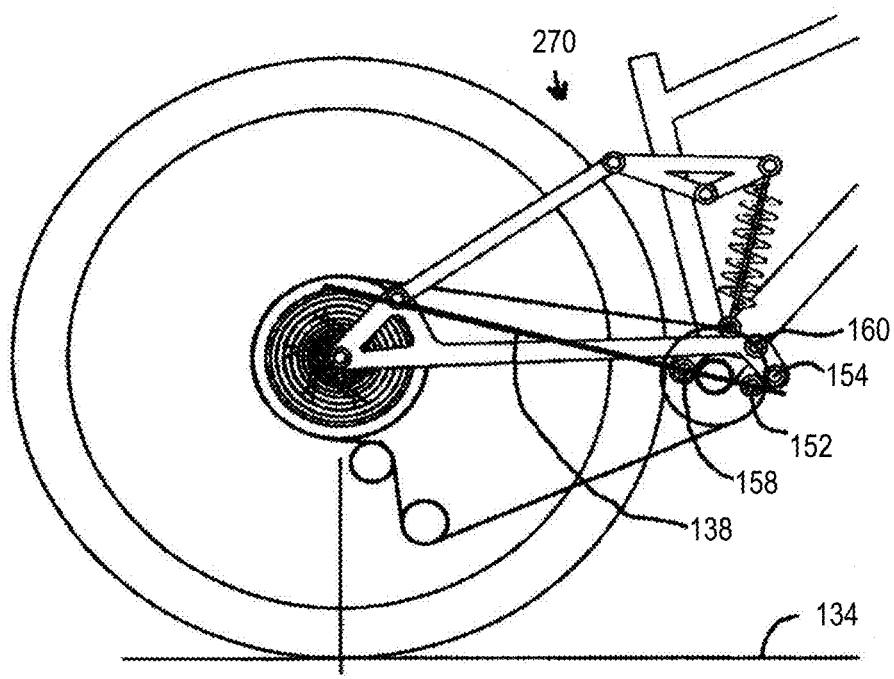
FIG. 15 shows a dual short link 4-bar suspension with linkage actuated shock embodiment optimized for 50% compression, at 0% compression.
Figure 16:
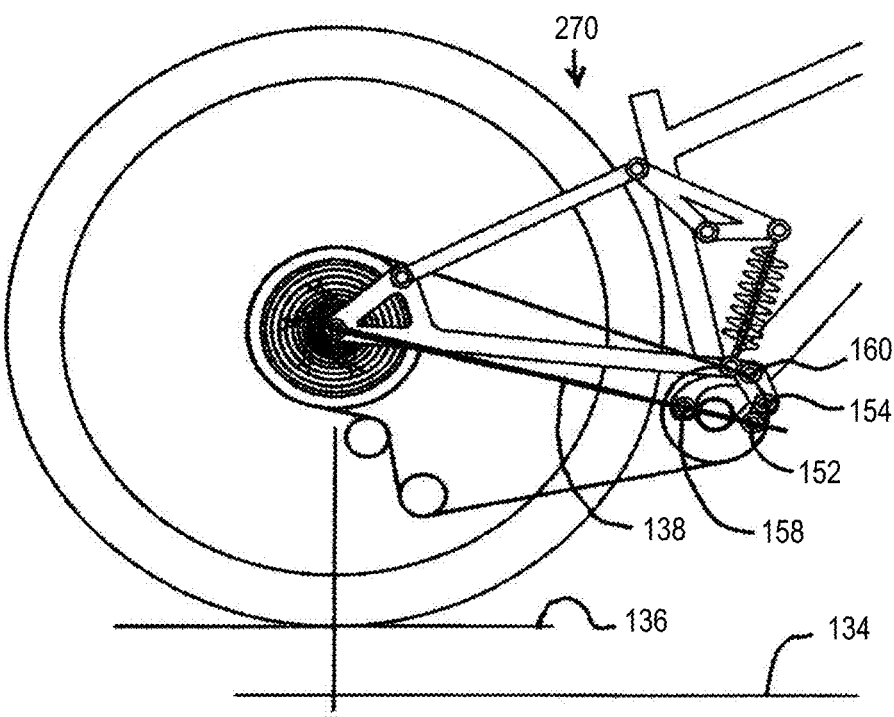
FIG. 16 shows the dual short link 4-bar suspension with linkage actuated shock embodiment optimized for 50% compression of FIG. 15, at 50% compression.

In the dual short link 4-bar suspension with linkage actuated shock embodiment optimized for 50% compression 270 shown in FIGS. 15 and 16, the X,Y coordinates are:
rear wheel axis of rotation 132: −430.0, 24.0;
first link front triangle pivot axis 152: 42.9, −11.3;
first link rear triangle pivot axis 154: 68.9, 0.8;
second link front triangle pivot axis 158: −35.0, 8.5; and
second link rear triangle pivot axis 160: 47.5, 36.0.

Figure 17:
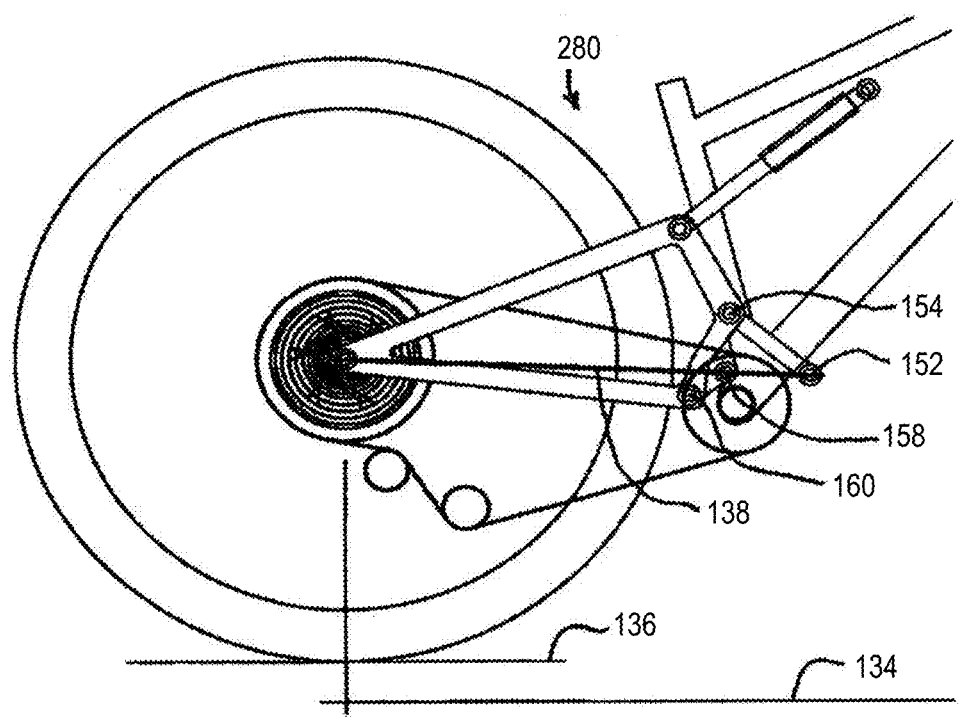
FIG. 17 shows a short link 4-bar embodiment configured for alignment of the front triangle pivots with the rear axle at 30% compression, shown at 30% compression.

In the short link 4-bar embodiment configured for alignment of the front triangle pivots with the rear axle at 30% compression 280 shown in FIG. 17, the X,Y coordinates are:
rear wheel axis of rotation 132: −441.0, 6.9;
first link front triangle pivot axis 152: 83.9, 35.2;
first link rear triangle pivot axis 154: −11.0, 108.2;
second link front triangle pivot axis 158: −11.8, 38.7; and
second link rear triangle pivot axis 160: −45.8, 2.1.

Figure 18:
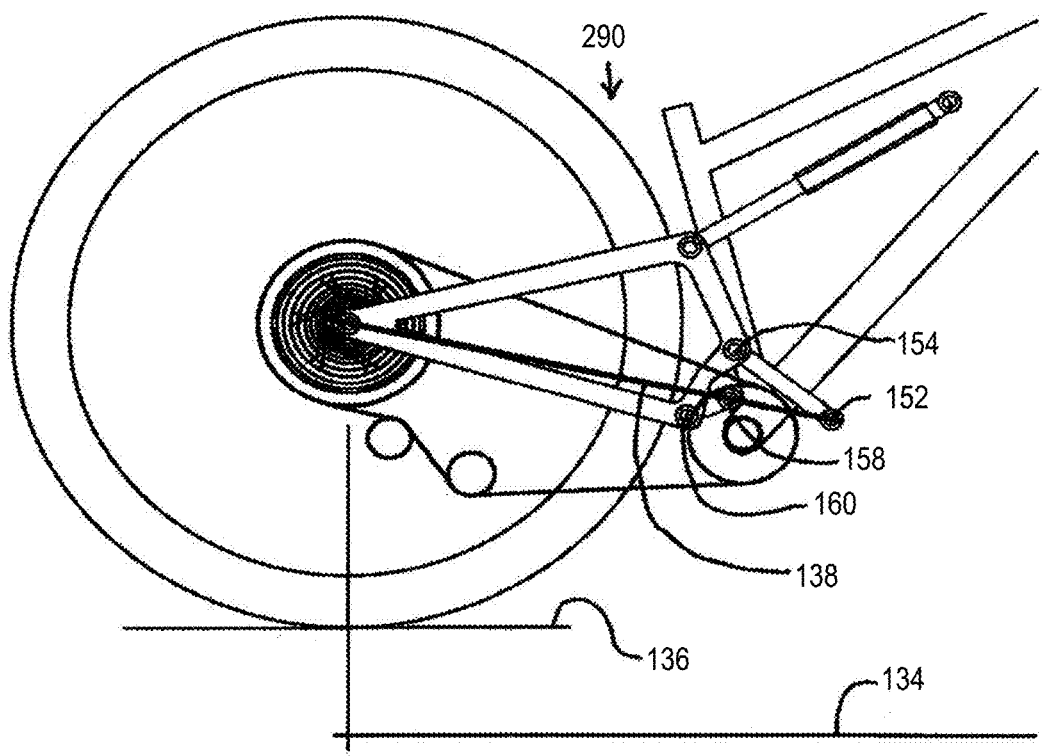
FIG. 18 shows a short link 4-bar embodiment configured for alignment of the front triangle pivots with the rear axle at 77% compression, shown at 77% compression.

In the dual short link embodiment configured for alignment of the front triangle pivots with the rear axle at 77% compression 290 shown in FIG. 18, the X,Y coordinates are:
rear wheel axis of rotation 132: −441.0, 6.9;
first link front triangle pivot axis 152: 99.3, 17.9;
first link rear triangle pivot axis 154: −16.0, 93.6;
second link front triangle pivot axis 158: −14.2, 43.3; and
second link rear triangle pivot axis 160: −45.6, 1.5.

Figure 19:
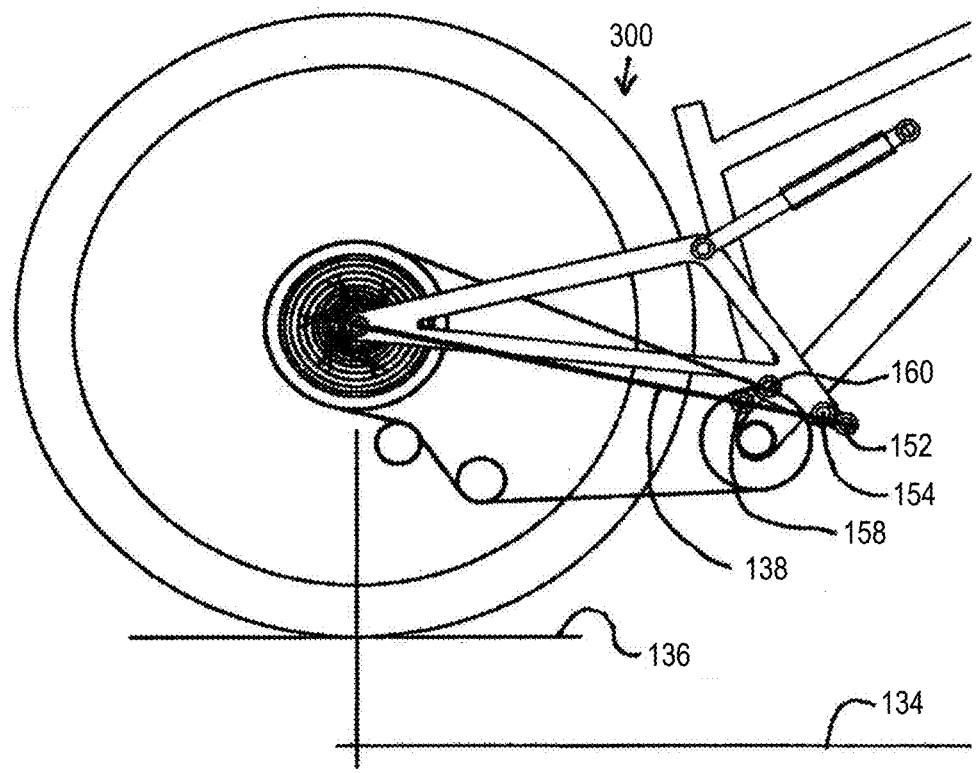
FIG. 19 shows a dual short link embodiment configures for alignment of the front triangle pivots with the rear axle at 77% compression, shown at 77% compression.

In the short link 4-bar embodiment configured for alignment of the front triangle pivots with the rear axle at 77% compression 300 shown in FIG. 19, the X,Y coordinates are:
rear wheel axis of rotation 132: −441.0, 6.9;
first link front triangle pivot axis 152: 99.3, 17.9;
first link rear triangle pivot axis 154: 84.2, 41.5;
second link front triangle pivot axis 158: −14.2, 43.3; and
second link rear triangle pivot axis 160: 18.7, 57.0.

Figure 20:
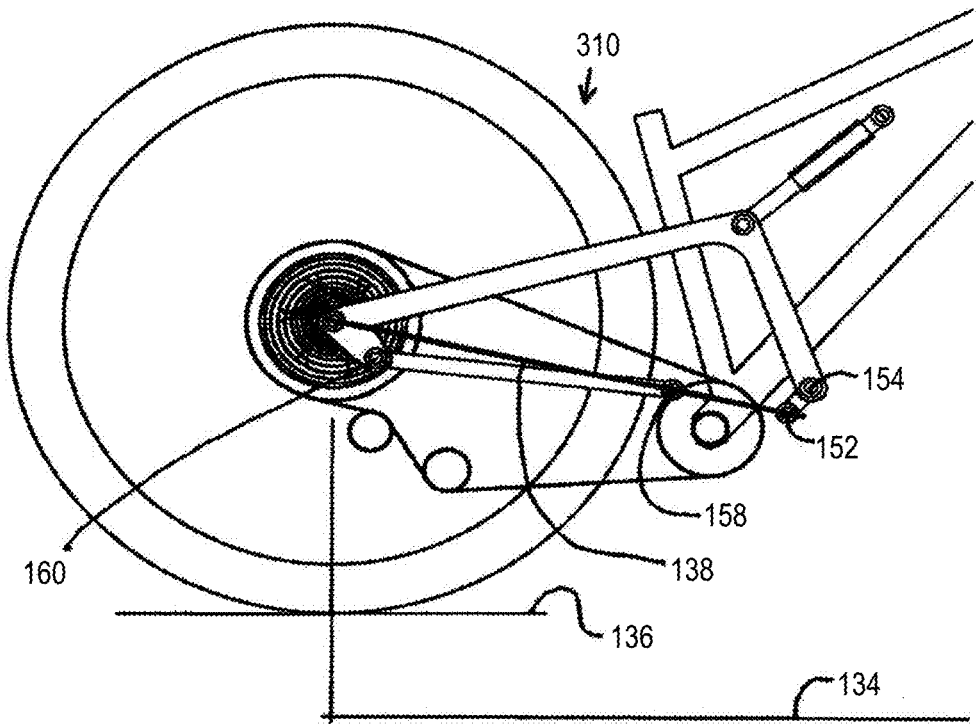
FIG. 20 shows a long link embodiment configured for alignment of the front triangle pivots with the rear axle at 77% compression, shown at 77% compression.

In the long link embodiment configured for alignment of the front triangle pivots with the rear axle at 77% compression 310 shown in FIG. 20, the X,Y coordinates are:
rear wheel axis of rotation 132: −441.0, 6.9;
first link front triangle pivot axis 152: 89.1, 20.2;
first link rear triangle pivot axis 154: 117.7, 51.8;
second link front triangle pivot axis 158: −44.0, 50.1; and
second link rear triangle pivot axis 160: −381.8, −26.9.

The scope of the claims should not be limited by the preferred embodiments set forth in the examples, but should be given the broadest interpretation consistent with the description as a whole.

The invention claimed is:

1. A bicycle suspension system for attaching a rear wheel with a rear wheel axle defining a rear wheel axis of rotation, to a front triangle, being a component of a bicycle equipped with the suspension system, having a bottom bracket defining a bottom bracket axis of rotation, the bicycle having a right side being on the right hand side when the bicycle is viewed from the rear, the bicycle suspension system comprising:
 a rear triangle to which the rear wheel axle is mounted;
 a shock absorber interposed between the front triangle and the rear triangle;
 a first link:
  pivotally connected to the front triangle at a first link front triangle pivot defining a first link front triangle pivot axis; and
  connected directly or indirectly to the rear triangle at a first link rear triangle pivot;
 a second link:
  pivotally connected to the front triangle at a second link front triangle pivot defining a second link front triangle pivot axis; and
  connected directly or indirectly to the rear triangle at a second link rear triangle pivot;
 wherein:
  the first link front triangle pivot and second link front triangle pivot are aligned along a chain tension vector;
  whereby, the suspension system is reversibly compressible from 0% compression, being an unloaded at-rest position, to 100% compression; and
 wherein:
  at an optimized suspension compression, both of the first link front triangle pivot axis and the second link front triangle pivot axis are on a line parallel to, and no more than 30 mm from, a notional line passing through the rear axle axis of rotation and the bottom bracket axis of rotation; and
  the optimized suspension compression is in the range of 10% to 100% compression.

2. The bicycle suspension system of claim 1, wherein the optimized suspension compression is in the range of 30% to 60% compression.

3. The bicycle suspension system of claim 1, wherein each of the first link front triangle pivot axis and the second link front triangle pivot axis is no more than 18 mm from the notional line passing through the rear axle axis of rotation and the bottom bracket axis of rotation.

4. The bicycle suspension system of claim 1, wherein
 the optimized suspension compression is in the range of 30% to 60% compression; and
 each of the first link front triangle pivot axis and the second link front triangle pivot axis is no more than 18 mm from the notional line passing through the rear axle axis of rotation and the bottom bracket axis of rotation.

5. The bicycle suspension system of claim 1, wherein,
 the optimized suspension compression is 100%; and
 with the suspension system in the unloaded at-rest position, in terms of an X, Y coordinate system with the X axis parallel to the horizontal surface and with the intersection of the X axis and Y axis aligned with the bottom bracket axis of rotation, the coordinates in mm's are about as follows:
rear wheel axis of rotation: −441.0, 6.9;
first link front triangle pivot axis: 38.6, −16.0;
first link rear triangle pivot axis: 60.3, 2.5;
second link front triangle pivot axis: −41.5, 17.3; and
second link rear triangle pivot axis: 47.7, 58.5.

6. The bicycle suspension system of claim 1, wherein,
the optimized suspension compression is 30%; and
with the suspension system in the unloaded at-rest position, in terms of an X, Y coordinate system with the X axis parallel to the horizontal surface and with the intersection of the X axis and Y axis aligned with the bottom bracket axis of rotation, the coordinates in mm's are about as follows:
rear wheel axis of rotation: −441.0, 6.9;
first link front triangle pivot axis: 46.0, −5.9;
first link rear triangle pivot axis: 71.4, 12.6;
link front triangle pivot axis: −42.3, 6.1; and
second link rear triangle pivot axis: 60.7, 53.1.

7. The bicycle suspension system of claim 1, wherein,
the optimized suspension compression is 100%; and
with the suspension system in the unloaded at-rest position, in terms of an X, Y coordinate system with the X axis parallel to the horizontal surface and with the intersection of the X axis and Y axis aligned with the bottom bracket axis of rotation, the coordinates in mm's are about as follows:
rear wheel axis of rotation: −441.0, 6.9;
first link front triangle pivot axis 152: 55.3, −23.4;
first link rear triangle pivot axis: 63.5, 3.9;
second link front triangle pivot axis: −150.0, 62.5; and
second link rear triangle pivot axis: −399.6, 1.5.

8. The bicycle suspension system of claim 1, wherein,
the optimized suspension compression is 30%; and
with the suspension system in the unloaded at-rest position, in terms of an X, Y coordinate system with the X axis parallel to the horizontal surface and with the intersection of the X axis and Y axis aligned with the bottom bracket axis of rotation, the coordinates in mm's are about as follows:
rear wheel axis of rotation: −441.0, 6.9;
first link front triangle pivot axis: 54.6, −6.5;
first link rear triangle pivot axis: 70.5, 25.2;
second link front triangle pivot axis: −153.5, 20.1; and
second link rear triangle pivot axis: −418.5, −86.3.

9. The bicycle suspension system of claim 1, wherein,
the optimized suspension compression is 49%; and
with the suspension system in the unloaded at-rest position, in terms of an X, Y coordinate system with the X axis parallel to the horizontal surface and with the intersection of the X axis and Y axis aligned with the bottom bracket axis of rotation, the coordinates in mm's are about as follows:
rear wheel axis of rotation: −431.0, 26.0;
first link front triangle pivot axis: 51.4, −13.0;
first link rear triangle pivot axis: 81.3, 0.5;
second link front triangle pivot axis: 0.0, 0.0; and
second link rear triangle pivot axis: 60.2, 23.3.

10. The bicycle suspension system of claim 1, wherein,
the optimized suspension compression is 49%; and
with the suspension system in the unloaded at-rest position, in terms of an X, Y coordinate system with the X axis parallel to the horizontal surface and with the intersection of the X axis and Y axis aligned with the bottom bracket axis of rotation, the coordinates in mm's are about as follows:
rear wheel axis of rotation: −431.0, 26.0;
first link front triangle pivot axis: 0.0, 0.0;
first link rear triangle pivot axis: 33.0, 39.0;
second link front triangle pivot axis: −38.9, 9.8; and
second link rear triangle pivot axis: 46.1, 76.2.

11. The bicycle suspension system of claim 1,
wherein the rear triangle is a seatstay; and
further comprising:
a chainstay, wherein
the first link is connected indirectly to the rear triangle via the chainstay wherein the first link front triangle pivot axis is a first link chainstay pivot axis;
the second link is connected indirectly to the rear triangle via the chainstay wherein the second link rear triangle pivot axis is a second link chainstay pivot axis;
the chainstay and seatstay are pivotally connected one to the other at a chainstay-seatstay pivot defining a chainstay-seatstay pivot axis; and
a third link
pivotally connected to the front triangle at a third link front triangle pivot defining a third link front triangle pivot axis; and
pivotally connected to the seatstay at a third link seatstay pivot defining a third link seatstay pivot axis; and
wherein:
the optimized suspension compression is 46%; and
with the suspension system in the unloaded at-rest position, in terms of an X,Y coordinate system with the X axis parallel to the horizontal surface and with the intersection of the X axis and Y axis aligned with the bottom bracket axis of rotation, the coordinates in mm's are about as follows:
rear wheel axis of rotation: −433.8, 24.1;
first link front triangle pivot axis: 56.0, −13.0;
first link chainstay pivot axis: 82.0, 1.1;
second link front triangle pivot axis: −39.4, 9.0;
second link chainstay pivot axis: 28.6, 28.2;
chainstay-seatstay pivot axis: −385.4, 18.5;
third link front triangle pivot axis: 8.0, 228.4; and
third link seatstay pivot axis: −59.1, 236.5.

12. The bicycle suspension system of claim 1, wherein,
the optimized suspension compression is 50%; and
with the suspension system in the unloaded at-rest position, in terms of an X,Y coordinate system with the X axis parallel to the horizontal surface and with the intersection of the X axis and Y axis aligned with the bottom bracket axis of rotation, the coordinates in mm's are about as follows:
rear wheel axis of rotation: −430.0, 24.0;
first link front triangle pivot axis: 42.9, −11.3;
first link rear triangle pivot axis: 68.9, 0.8;
second link front triangle pivot axis: −35.0, 8.5; and
second link rear triangle pivot axis: 47.5, 36.0.

* * * * *